July 6, 1965  A. HEINZ  3,193,686
PHOTOSENSITIVE DETECTORS AND METHODS UTILIZING PHOTOSENSITIVE
DETECTORS FOR POSITIONING ARTICLES
Filed May 7, 1963  6 Sheets-Sheet 1

INVENTOR.
ALFRED HEINZ
BY Albert R. Hodges
ATTORNEY

July 6, 1965 A. HEINZ 3,193,686
PHOTOSENSITIVE DETECTORS AND METHODS UTILIZING PHOTOSENSITIVE
DETECTORS FOR POSITIONING ARTICLES
Filed May 7, 1963 6 Sheets-Sheet 4
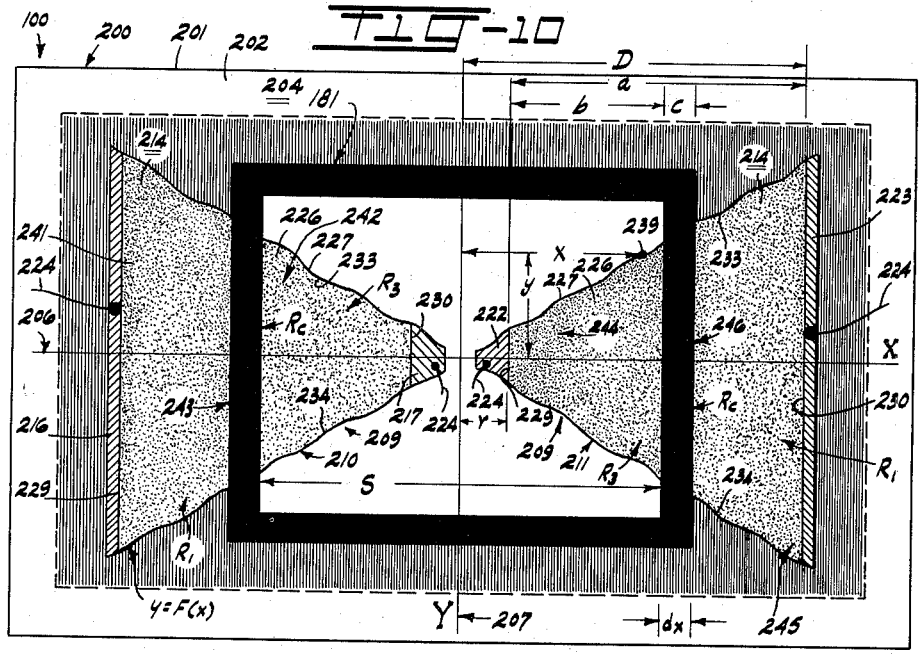
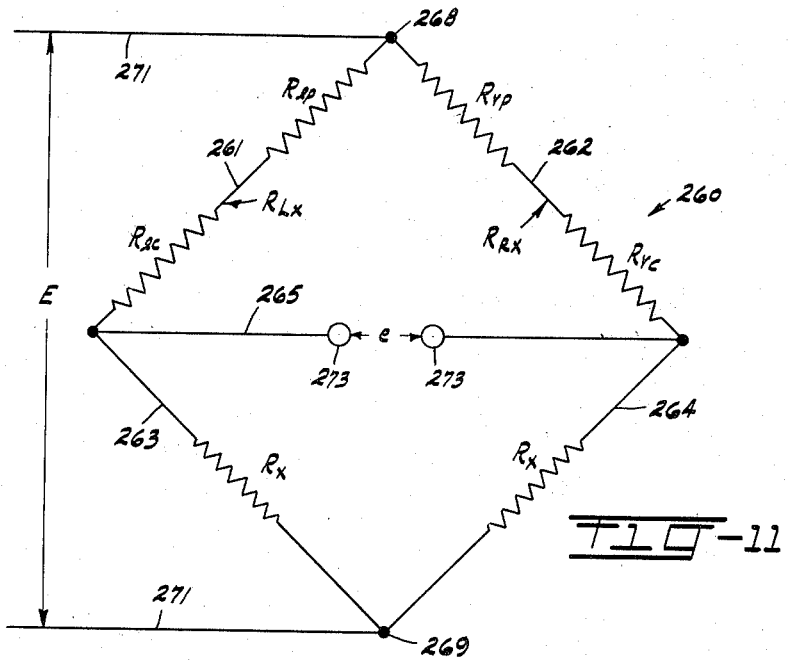

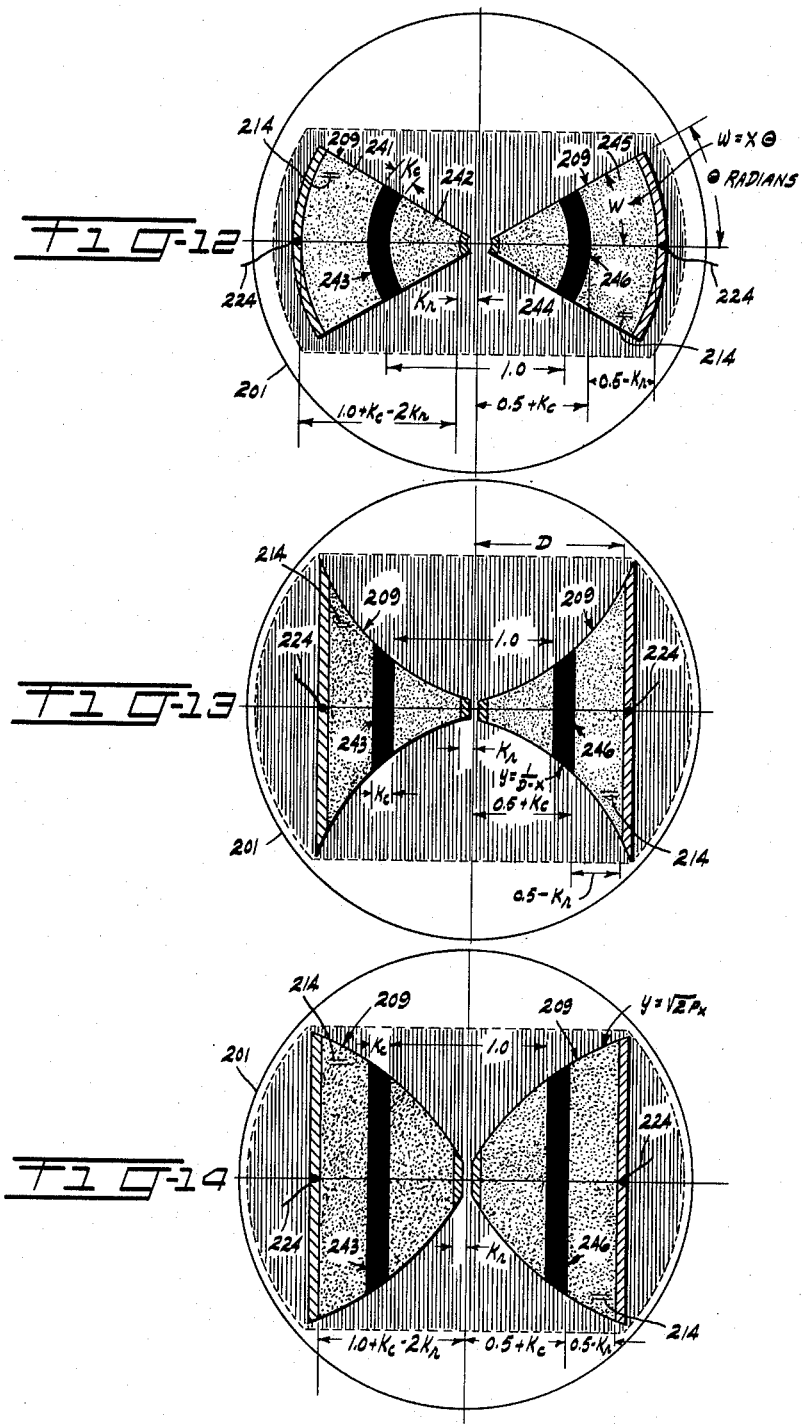

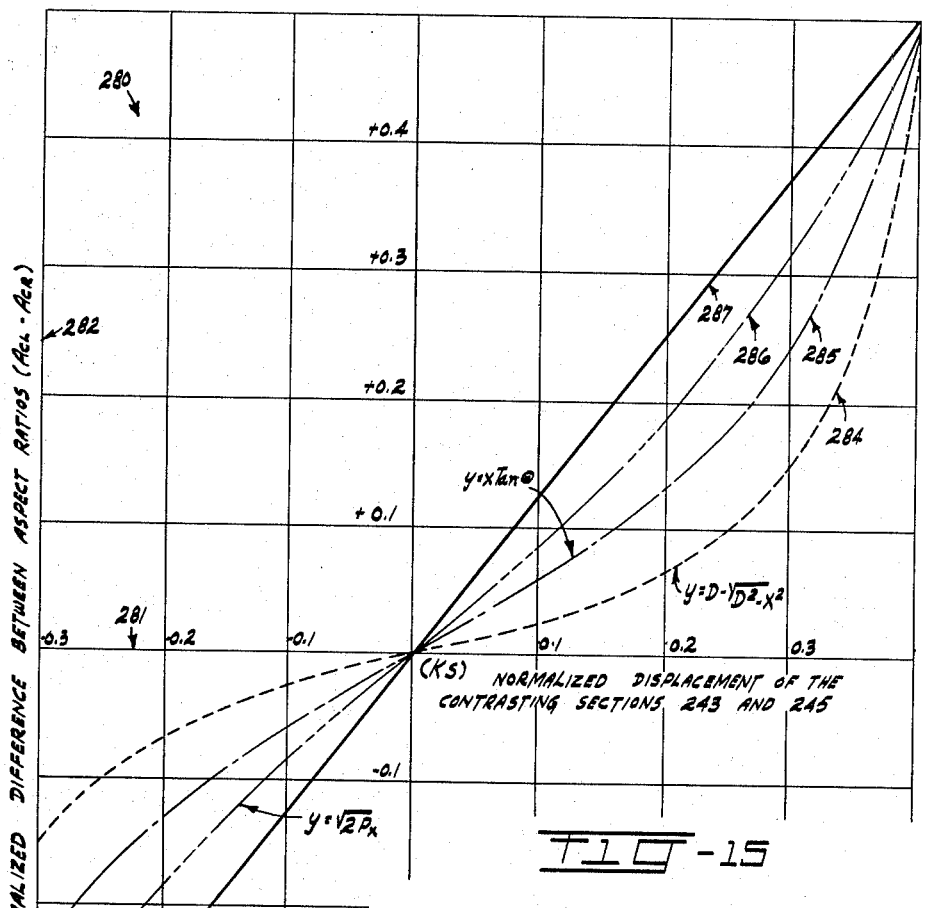
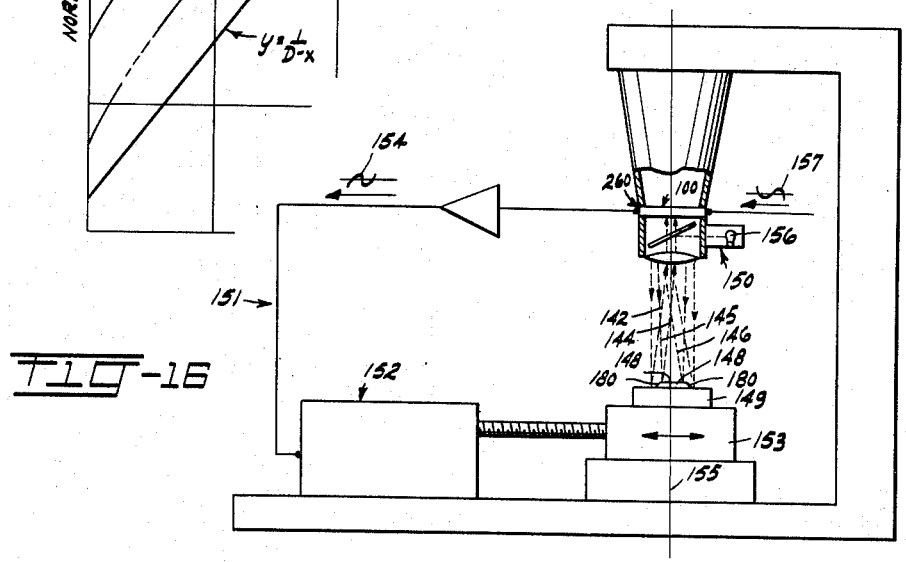

United States Patent Office 3,193,686
Patented July 6, 1965

3,193,686
PHOTOSENSITIVE DETECTORS AND METHODS UTILIZING PHOTOSENSITIVE DETECTORS FOR POSITIONING ARTICLES
Alfred Heinz, Flemington, N.J., assignor to Western Electric Company, Incorporated, New York, N.Y., a corporation of New York
Filed May 7, 1963, Ser. No. 279,681
4 Claims. (Cl. 250—211)

This invention relates to photosensitive detectors and to methods utilizing photosensitive detectors for positioning articles. More particularly, this invention relates to such detectors comprising thin films of photoconductive material formed upon a nonconductive substrate surface and to methods utilizing such detectors to control the positioning of articles by a positioning facility having a known dynamic response characteristic.

This application is a continuation-in-part of copending application Serial Number 99,945, filed March 31, 1961, now abandoned.

Various photosensitive detecting systems are known for analyzing an illuminated surface to determine its equivalent light radiating center for servo-control information, for example, the electro-optical celestial body tracking system set forth in Patent 2,931,757 to R. E. Houle. In a tracking system of this type, light received from a distant celestial body is divided into various segments, each being applied to one of a plurality of photocells. A servo mechanism, incorporated in the tracking system and responsive to an unbalance between the electrical signals provided by the photocells, is adapted to adjust the alignment of the tracking system with respect to the tracked body so as to balance the photocell signals. Often, a system of this type is subject to servo-hunting, i.e., the situation wherein a servo mechanism does not directly provide accurate alignment, but slightly overadjusts the system alignment in a series of alternate direction motions. Special compensating feedback circuits are generally provided to eliminate such servo-hunting.

An electro-optical servo positioning system of the type disclosed in A. Heinz Patent 3,029,348, if it is to operate most efficiently, may also require a compensating feature to eliminate servo-hunting. This system is adapted to position an illuminated body, for example an illuminated semiconductor wafer having a surface comprising predetermined distinct areas of contrasting brightness, in such a manner that the predetermined component surface areas have preselected alignments. The positioning of the body is achieved by selecting light from distinct geometric portions of an image of the illuminated wafer and applying light from each of the portions to one of a plurality of photosensitive elements. As in the above-described tracking system, a servo mechanism responsive to an unbalance between the photosensitive elements positions the illuminated body in the predetermined position.

An object of the present invention is to provide new and improved photosensitive detectors and methods using photosensitive detectors for positioning articles.

Another object of the present invention is to provide photosensitive detectors that are so formed as to have variable sensitivity characteristics, wherein such characteristics are dependent upon both the total amount of light that impinges upon a photoconductive film, and the distribution (location) of such light on the film.

Still another object of this invention resides in the provision of photoconductive detectors having increased sensitivity toward an optical axis for automatically eliminating servo-hunting upon incorporation of the detectors in any one of the above-described systems.

A further object of the present invention is to provide in a variable resistance device for sensing the position of a beam of light, a photoconductive film on an insulative substrate wherein movement of the light beam divides the film into sections having predetermined aspect ratios defined by the ratio of a longitudinal dimension of a section to a transverse dimension of the section, the transverse dimension of the sections being a predetermined function of the longitudinal dimension thereof, in conjunction with electrodes connected to the film for establishing across the film a resistance path having a resistance that varies according to variations in the aspect ratio of a section illuminated by the beam of light.

A still further object of the present invention is to provide photoconductive detectors of miniature size, comparable for example to transistor headers, for utilization in the above-mentioned electro-optical servo positioning system without such system requiring extensive optical magnification, to permit less costly optical systems to be utilized in such positioning system.

An additional object of the present invention resides in the provision, in a variable resistance device for sensing the position of a pair of beams of light radiation, of a pair of very thin layers of photoconductive material, wherein each of the very thin layers is provided with a perimeter having a predetermined configuration so that one beam of light impinging on a section of each of said very thin layers has a preselected aspect ratio, in conjunction with facilities for establishing across said very thin layers opposing resistance paths having an effective resistance proportional to the difference between the aspect ratios of said beams of light.

A yet additional object of the present invention resides in a method of positioning an article relative to a reference point utilizing driving facilities having a known dynamic response characteristic, including the steps of sensing the position of the article with variable resistance instrumentalities and modulating a control signal for the driving facilities according to the position sensed by the variable resistance instrumentalities and the dynamic response characteristics of the facilities.

With these and other objects in view, the present invention contemplates apparatus including at least one photosensitive detector for practicing the method of the present invention to position an article relative to a reference point. The photosensitive detector may include an insulative support and at least one thin film of photoconductive material formed on the support. The thin film is defined by opposite end edges and opposite side edges. The distance between the side edges at any point on the side edges bears a selected relationship to the distance of such point from one of the end edges so that a beam of light representative of the position of the article illuminates a section of the surface of the thin film. Because of such selected relationship, the illuminated section has a predetermined aspect ratio depending upon the position of the light beam relative to one of the end edges of the thin film. Facilities are provided for establishing across the thin film a resistance path having a resistance proportional to the aspect ratio of the illuminated section. The selected relationship is determined by analyzing the dynamic response characteristic of a facility for positioning the article so that the resistance path is effective to regulate a signal for controlling the facility without causing hunting of the facility with respect to the reference point.

In the method of the present invention for positioning an article relative to a reference point, the position of the article is represented by at least one beam of light. Driving facilities having a known dynamic response characteristic are utilized in conjunction with a variable resistance device wherein the resistance is varied in response to the position of the beam of light thereon and in accordance with the dynamic response characteristic of the facilities. The article and the device are mounted for relative movement in response to the driving facilities. A signal is conducted across the device for regulation by the resistance of the device. The regulated signal is then utilized to energize the driving facilities to position the object relative to the reference point without causing hunting of the facilities relative to the reference point.

Apparatus illustrating certain aspects of the present invention may include a non-conductive substrate provided with a thin film of photoconductive material having opposed end edges and opposed side edges. The side edges may be positioned symmetrically relative to a reference line provided on the substrate. The side edges follow the locus defined by $y=F(x)$, where $(x)$ is the distance along the reference line from one of the end edges and $(y)$ is the length between the side edges and the reference line of a line normal to the reference line.

Apparatus comprising an embodiment of one aspect of the present invention may include a nonconductive substrate having formed thereon a thin film of photoconductive material provided with a pair of opposed end edges and a pair of symmetrical side edges. The distance $(y)$ of each of the side edges from a reference axis may be defined by the general expression $y=F(x)$, so that a beam of light incident to the surface of the thin film defines a strip having a selected aspect ratio A equal to $(dx/2y)$. The resistance of the thin film is a function of the difference between the aspect ratios of the entire thin film illumination and the strip illuminated by the beam. The general expression $y=F(x)$ may be selected so that the strip illuminated by the beam has a predetermined aspect ratio for a particular positioning of the beam on the thin film. Accordingly, the dynamic response characteristic of a servo system controlled by a signal regulated by the resistance of the thin film, may be compensated for by proper selection of the expression $y=F(x)$.

An embodiment of the present invention which may be utilized with certain servo systems includes a detector comprising a nonconductive substrate surface having formed thereon a thin film photoconductive pattern in the form of symmetrical wing-shaped trapezoids. Terminal electrodes are connected to the trapezoid bases for connecting the detector to, for example, bridge circuitry for providing signals to control the servo system.

Another embodiment of the present invention differs principally from the first in that the sides of the symmetrical wings form portions of semicircles having diameters equal in length to the distance between the terminal electrodes furthest removed from each other.

A complete understanding of the invention may be obtained from the following detailed description of the method of the invention and apparatus for performing the method forming specific embodiments thereof when read in conjunction with the appended drawings, in which.

Figure 6:
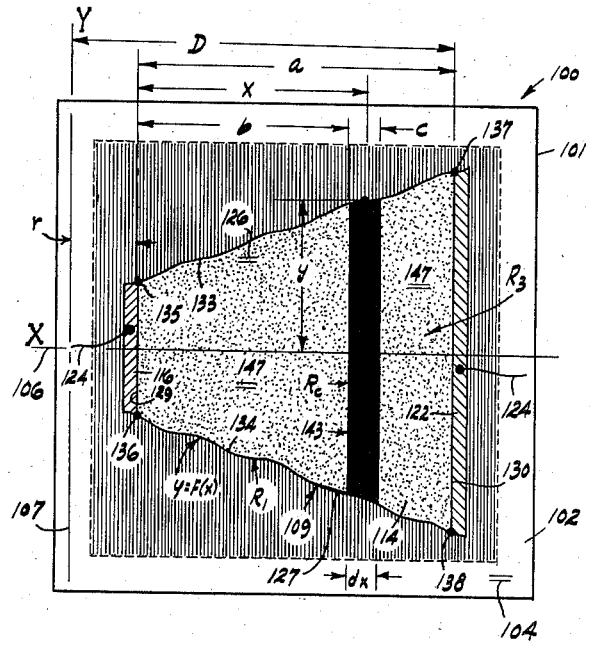
Figure 7:
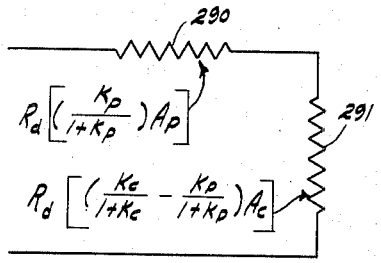
Figure 8:
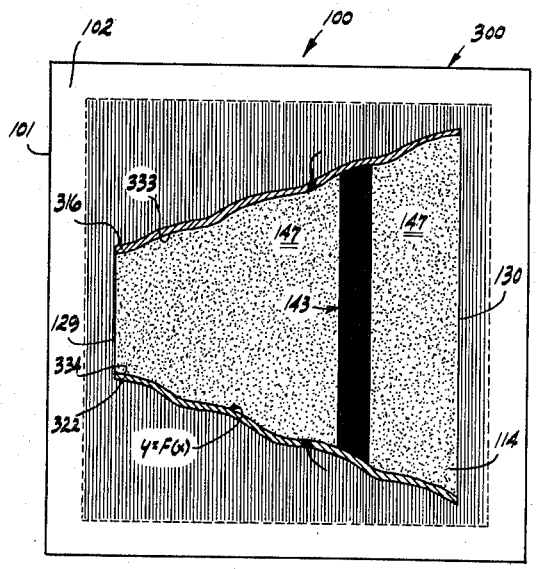
Figure 9:
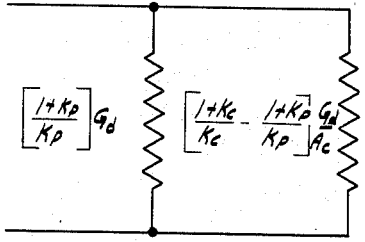

FIG. 6 is a plan view of a photosensitive detector for response to a band of illumination having an intensity contrasting with the intensity of background illumination sensed by the detector, illustrating a pair of spaced electrodes formed on a substrate for defining end edges of a resistance path across a photoconductive film provided on the substrate, so that the resistance of the path defined in terms of the aspect ratio of the band compensates in a predetermined manner for a dynamic response characteristic of a servo system for positioning an object;

FIG. 7 is a schematic diagram illustrating an equivalent circuit representing the resistance path of the film shown in FIG. 6;

FIG. 8 is a plan view of a photosensitive detector similar to the detector shown in FIG. 6 wherein the electrodes are formed on side edges of the film;

FIG. 9 is a schematic diagram similar to FIG. 7 illustrating an equivalent circuit for the conductance of the resistance path shown in FIG. 8;

FIG. 10 is a plan view of a photosensitive detector for response to a plurality of bands of illumination each having an intensity contrasting with the intensity of background illumination, illustrating a pair of electrodes and a pair of thin photoconductive films formed on a substrate symmetrically with respect to a pair of mutually perpendicular axes for establishing a pair of resistance paths responsive to the bands of illumination to regulate according to the positioning of the bands and a predetermined dynamic response characteristic a control signal for a servo positioning system having the characteristic;

FIG. 11 is a schematic diagram of a bridge circuit illustrating equivalent resistances of the detectors shown in FIG. 10;

FIG. 12 is a plan view of the detector shown in FIG. 10 wherein the side edges of the thin film are formed according to the expression:

$$w=x\theta$$

and the electrodes are arcuate sections for establishing a first pair of selected resistance paths which compensate for a first predetermined type of dynamic response characteristic of a servo system;

FIG. 13 is a plan view of the detector shown in FIG. 10 wherein the side edges of the thin film are formed according to the expression:

$$y=\frac{1}{D-x}$$

and the electrodes are in spaced parallel relationship for establishing a selected pair of resistance paths which compensate for a second predetermined type of dynamic response characteristic of a servo system;

FIG. 14 is a plan view of the detector shown in FIG. 10 wherein the side edges of the thin film are formed according to the expression:

$$y=\sqrt{2Px}$$

and the electrodes are in spaced parallel relationship for establishing a pair of resistance paths which compensate for a third predetermined dynamic response characteristic of a servo system;

FIG. 15 is a chart illustrating the normalized differential between the aspect ratios of bands of contrasting illumination as functions of displacement of the bands from the Y axis; and FIG. 16 is an elevational view of an electro-optical servo system which may be controlled by a signal regulated by the photosensitive detectors of the present invention according to the method of the present invention for positioning an article.

Referring first to FIG. 6, a photosensitive detector or variable resistance device 100 of the present invention is shown including a support, such as a body or substrate 101 of electrically insulative material, having an upper surface 102 defining a plane 104. For purposes of illustration, the surface of the substrate 101 is provided with mutually perpendicular X and Y reference axes 106 and 107, respectively.

A photoconductive unit 109, provided on the surface 102 of the substrate 101, may include a thin film or very thin layer 114 of photoconductive material formed in a predetermined pattern on the surface 102 and a pair of elongated conductors or electrodes 116 and 122 formed in electrical contact with the thin film 114. Connectors such as lead wires 124—124 are secured in electrical contact with the electrodes 116 and 122 for connecting the unit 109—109 to suitable control circuitry.

The thin film 114 is provided with an upper surface 126 and a perimeter 127 including a pair of opposed end edges 129 and 130 contacting the respective electrodes 116 and 122 and defining the bounds of the thin film 114 in the direction of the X axis 106. The perimeter 127 also includes opposed side edges 133 and 134 which extend from respective points 135 and 136 on the electrode 116 along prescribed congruent paths to respective points 137 and 138 of the electrode 122.

For purposes of considering the thin film 114 in further detail, the thin film 114 will be described as being formed symmetrically with respect to the X axis 106 so that distances (y) between the X axis 106 and the side edges 133 and 134 perpendicular to the X axis are equal. The prescribed congruent paths of the side edges 133 and 134 may be defined by the expression:

$$y = F(x)$$

so that the distance (y) of any point 139 on the side edges 133 and 134 from the X axis 106 bears a predetermined relationship to the distance (x) of such point 139 from the Y axis 107.

The photosensitive detector 100 may be utilized in conjunction with optical facilities 150 (FIG. 16) for illuminating an article 149 which in turn reflects illumination onto the photosensitive detector 100. Such facilities 150 may be incorporated, for example, in an electro-optical servo positioning system of the type disclosed in A. Heinz Patent 3,029,348, shown schematically and indicated by the reference numeral 151 in FIG. 16. A surface 148 of the article 149 may reflect light onto only a spot or a strip of the surface of the thin film 114 of photosensitive detector 100, leaving the remainder of the thin film 114 in total darkness. It is to be understood that the spot or strip in such case would receive illumination of an intensity of a predetermined value so as to contrast with the remaining dark portion of the thin film 114.

For the purposes of describing the principles of the present invention, it will be assumed that reflection from the surface 148 of the article illuminates the entire surface 126 of the thin film 114 with a beam 142 of background illumination or light of a first intensity and illuminates a contrasting section 143, superimposed on the surface 126 of the thin film 114, with a band or narrow contrast strip 144 of illumination having a second intensity. If the surface 148 of the article 149 is of a different configuration, the single strip 144 may comprise left and right spaced strips 145 and 146 of illumination having the second intensity may reflect onto the surface 126, as shown in FIG. 16. The first and second respective intensities of illumination of the beam 142 and the strip 144 may be described as being contrasting intensities, wherein the background illumination is either brighter than or darker than the contrast strip 144 of illumination, the degree of darkness being limited, of course, by total darkness. Also, it will be assumed that the contrast strip 144 and hence, the contrasting section 143, in the present example, have constant lengths (dx) in the direction of the X axis 106 and are perpendicular to the X axis.

The position of the strip 144 and hence the contrasting section 143 on the thin film 114 between the electrodes 116 and 122 is adjusted by the facilities 150 to represent the position of the article 149. When the contrasting section 143 is positioned between the electrodes 116 and 122, as shown in FIG. 6, left and right background sections 147—147 are formed on each side of the contrasting section 143. The resistance $R_1$, $R_C$ and $R_3$ of the left section 147—147, the contrasting section 143, and the right section 147—147, respectively, are proportional to the dark resistance ($R_d$) of the thin film 114, the intensity of illumination and the relative positioning of the strip 144 of illumination with respect to the electrodes 116 and 122. The aspect ratios $A_1$, $A_3$ and $A_C$ of the respective left and right background sections 147—147, and the contrasting section 143, are governed by the positioning of the strip 143. The aspect ratio $A_C$, for example, is defined by the ratio of the length (dx) of the contrasting section 143 in the direction of the X axis 106 to the height (2y) thereof to the side edge 133 in the direction of the Y axis 107. That is:

$$A_C = \frac{dx}{2y}$$

Thus, for a constant dark resistance ($R_d$), constant intensity of illumination and a constant length (dx), the resistance $R_C$ of the contrasting section 143 is proportional to the aspect ratio $A_C$, which in turn is a function of (y), where (y) is a predetermined function of (x).

Referring to FIG. 16 in greater detail, advantages resulting from use of the photosensitive detector 100 in the system 151 will become apparent. The system 151 may include a servo motor device 152 for reciprocating a table 153 to position the article 149 which is mounted on the table. The device 152 and its load have a known dynamic response characteristic which may be related to the value of a servo control signal 154 and the position of the table 153 respect to a reference axis 155. More particularly, in response to a standard servo control signal (not shown), the device 152 is subject to servo hunting and will overshoot the reference axis 155 rather than provide direct alignment with the reference axis.

When the detector 100 of the present invention is used in the system 151, light from a source 156 is directed onto the article 149 and is reflected thereby onto the detector 100 to form the background sections 147—147 and the contrasting section 143, for example, depending upon the characteristics of the surface of the article 149. The expression $y = F(x)$ which governs the shape of the side edges 133 and 134 of the thin film 114 is selected so that the respective aspect ratios $A_1$, $A_3$ and $A_C$ of the sections 147—147 and 143 and hence the respective resistances $R_1$, $R_3$, and $R_C$ of the sections, compensate for the dynamic response characteristic of the device 152. In this manner, the servo control signal 154 produced upon regulation of an input signal 157 by an effective resistance Rx of the detector 100 renders the device 152 effective to move the article 149 directly into alignment with the reference axis 155, and eliminates servo hunting and problems attendant therewith.

Referring now to FIG. 10, the photosensitive detector 100 is shown in a dual pattern embodiment 200 for use, for example, with an electro-optical servo positioning system 151 such as that shown in FIG. 16, wherein the light is reflected from the article 149 in the form of the beam 142 of background illumination and left and right strips 145 and 146, respectively, of contrasting illumination. Still referring to FIG. 10, there is shown a support such as a body or substrate 201 of electrically insulative material having an upper surface 202 defining a plane 204. For purposes of illustration, the surface 202 is provided with mutually perpendicular X and Y reference axes 206 and 207, respectively.

A pair of photoconductive units 209—209, including left and right units 210 and 211, respectively, provided on the surface 202 of the substrate 201 may each include a thin film or very thin layer 214—214 of photoconductive material formed on the surface 202. Each of the units 209—209 also includes a pair of elongated conductors or electrodes, the left unit 210 having electrodes 216 and 217 and the right unit 211 having electrodes 222 and 223, formed in electrical contact with each of the thin films 214—214. Connectors such as lead wires 224—224 are secured in electrical contact with each of the electrodes 216, 217, 222, and 223 for connecting the units 209—209 to suitable control circuitry.

The thin films 214—214 are each provided with an upper surface 226 and a perimeter 227. The perimeter 227 includes a pair of opposed end edges 229 and 230 contacting the electrodes 216 and 217, and 222 and 223, respectively, which define the thin films 214—214 in the direction of the X axis 206. The perimeter 227 of each of the thin films 214—214 also includes opposed side edges 233 and 234 which extend along prescribed congruent paths between ends of the electrodes 216, 217, 222, and 223 which are in common quadrants of the surface 202 of the substrate 201.

For the purposes of considering the thin films 214—214 in further detail, the films will be described as being formed symmetrically with respect to the X axis 206 so that distances ($y$) between the X axis 206 and the side edges 233 and 234 perpendicular to the X axis 206 are equal. The prescribed congruent paths of the side edges 233 and 234 may be defined by the expression:

$$y = F(x)$$

so that the distance ($y$) of any point 239 on the side edges 233 and 234 from the X axis 206 bears a predetermined relationship to the distance ($x$) of such point 239 from the Y axis 207.

As in the description of the photosensitive detector unit 109, it will be assumed that the strips of illumination 145 and 146 have a constant length ($dx$) in the direction of the X axis 206 and are perpendicular to the X axis. Similarly, the position of the strips 145 and 146 on the thin films 214—214 between the electrodes 216 and 217, and the electrodes 222 and 223, respectively, is adjusted by the facilities 150 to represent the position of the article 149.

When the contrast strips 145 and 146 are positioned to illuminate the thin films 214—214 between the electrodes 216 and 217, and 222 and 223, respectively, as shown in FIG. 10, each of the photoconductive units 214—214 is divided into three sections. The left unit 210 is divided into left and right background sections 241 and 242, respectively, and a left contrasting section 243 formed by the contrast strip 145. The right unit 211 is divided into left and right background sections 244 and 245, respectively, and a right contrasting section 246 formed by the contrast strip 146. The resistance of each of the sections 241 through 246 is proportional to the dark resistance ($R_d$) of the thin film 214—214, the intensity of the illumination and the relative positioning of the left and right contrast strips 145 and 146, respectively, with respect to the electrodes 217 and 222. The aspect ratio $A_{CL}$ of the left contrasting section 243 and the aspect ratio $A_{CR}$ of the right contrasting section 246 are governed by the positioning of the contrast strips 145 and 146. The aspect ratios $A_{CL}$ and $A_{CR}$ are defined by the ratio of the length ($dx$) of the respective left and right contrasting sections 243 and 246 in the direction of the X axis 206, to the height ($2y$) thereof in the direction of the Y axis 207. That is, for example:

$$A_{CL} = \frac{dx}{2y}$$

Thus for a constant ($R_d$), constant intensity of illumination and a constant length ($dx$), the resistance $R_{CL}$ and $R_{CR}$ of the left and right contrasting sections 243 and 246 are functions of ($y$), where ($y$) is a predetermined function of ($x$).

Referring now to FIGS. 11 and 16 the dual pattern photosensitive detector 200 may be used in conjunction with the system 151 by connecting one of the photoconductive units 209—209 in each leg of a bridge network 260. In general, the photoconductive units 209—209 are connected in legs 261 and 262 of the network 260 to provide variable resistances $R_{LX}$ and $R_{RX}$, respectively, for representing the relative positioning of the contrast strips 145 and 146 with respect to the Y axis 207, and hence the relative positioning of the article 149. In opposite legs 263 and 264 of the network 260, fixed resistances $R_X$ are provided having values of resistance corresponding to the resistance of the thin films 214—214 between the respective electrodes at the null position, i.e., when the contrast strips 145 and 146 are positioned symmetrically with respect to the Y axis 207. At the null position, the article 149 is centered with respect to the reference axis 155. Input lines 271—271 are connected to points 268 and 269 of the network 260 for impressing an input voltage E across the network. In response to unbalances in the resistances $R_{LX}$ and $R_{RX}$ of the legs 261 and 262, respectively (which are indicative of eccentric positioning of the contrast strips and with respect to the Y axis 207, and hence, of the article 149 with respect to the reference axis 155), an output voltage ($e$) appears across terminals 273—273 of the leg 265 of the bridge network 260. The output voltage ($e$) is, in general, proportional to the difference between the aspect ratio $A_{CL}$ and the aspect ratio $A_{CR}$ and may be utilized to regulate the input signal 157 to provide the servo control signal 154 which is effective to energize the servo device 152 for moving the article 149 directly into alignment with the reference axis 155 without servo hunting.

Referring now to FIG. 15 there is shown a graph 280 wherein displacement $K_S$ of the contrasting sections 243 and 246 (representing displacement of the article 149 from the reference axis 155) is shown on an abscissa 281 and corresponding differences in the aspect ratios $A_{CL}$ and $A_{CR}$ are plotted on the ordinate axis 282. Curves 284, 285, 286 and 287 indicate the aspect ratio differences when the side edges 233 and 234 are formed with distances ($y$) which are various functions of ($x$). Thus, the side edges 233 and 234 of thin films 214—214 represented by the curves 284, 285, 286 and 287 are formed as follows:

Curve 284 (FIG. 5), $$y = D - \sqrt{D^2 - x^2}$$

Curve 285 (FIG. 1), $$y = x \tan \theta$$

Curve 285 (FIG. 14), $$y = \sqrt{2Px}$$

and

Curve 287 (FIG. 13), $$y = \frac{1}{D - x}$$

Figure 1:
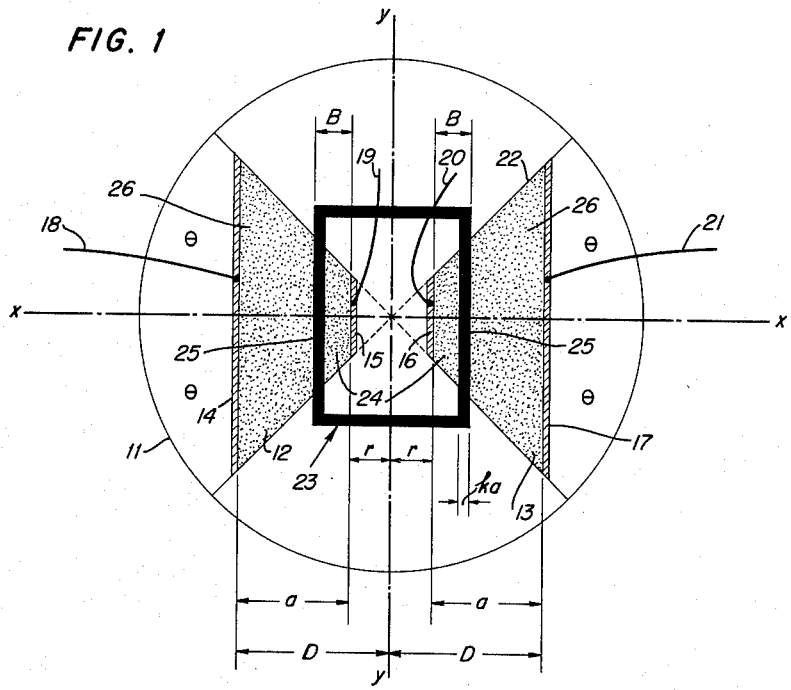
FIG. 1 is a plan view of an embodiment of the present invention illustrating a thin film of photoconductive material formed in the pattern of a pair of symmetrical trapezoids.
Figure 5:
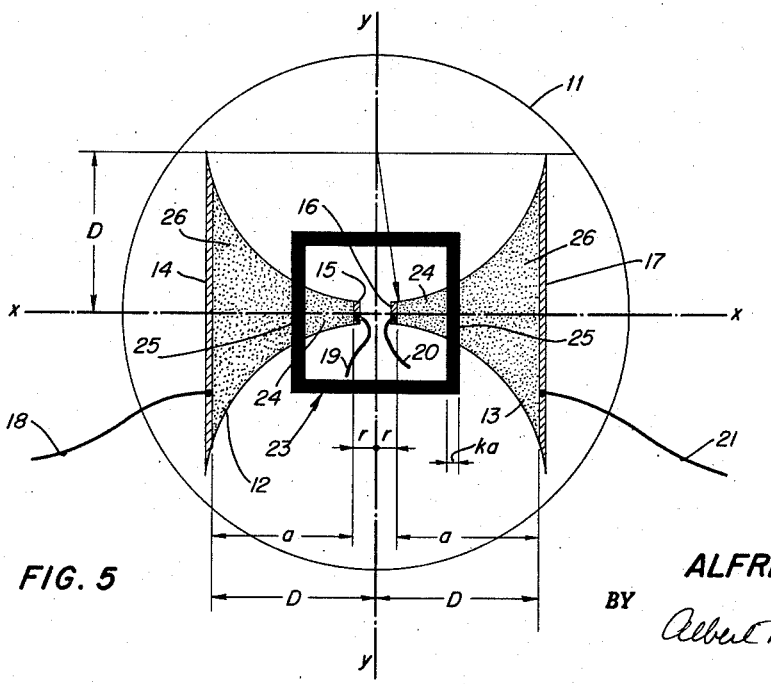
FIG. 5 is a plan view of another embodiment of the present invention illustrating a pair of wing-shaped thin films of photoconductive material each having similarly arched sides.

It may be understood from FIG. 15, that depending upon the dynamic response characteristic of the system 151, an expression:

$$y = F(x)$$

may easily be chosen so that the difference between the aspect ratios $A_{CL}$ and $A_{CR}$, and hence the output voltage ($e$), will automatically compensate for the dynamic response characteristic of the system 151. More particularly, it is noted that when the side edges 233 and 234 are formed as shown in FIG. 5, small changes in the contrast band displacement $ks$, where $ks$ equals between 0.3 and 0.4, result in substantial changes in the aspect ratio differential ($A_{CL} - A_{CR}$). It may also be understood from FIG. 15, first, that changes in the contrast band displacement $ks$ in the range of $ks$ between $+0.0$ and $+0.2$, produce significantly smaller aspect ratio differences, $$(A_{CL}-A_{CR})$$

and secondly, that the aspect ratio differential $$(A_{CL}-A_{CR})$$

in this range for the detector unit 10 of FIG. 5 is significantly less than the aspect ratio differential $(A_{CL}-A_{CR})$ of the respective units 10 and 204—204 shown in FIGS. 1, 13 and 14 and indicated by curves 285, 287 and 286, respectively.

Considering the details of the thin photoconductive films 114 and 214—214 shown in FIGS. 1, 5, 6 and 10 the resistance R of the films measured in darkness may be expressed as:

$$R=AR_d \quad (1)$$

where $A$ is the aspect ratio of each of the entire thin films and $R_d$ is the dark resistance of a square of each of the thin films. The aspect ratio $A$ is defined in general by the following equations:

$$A=\int_B^\alpha \frac{dx}{2y} \quad (2)$$

and $$A=\int_B^\alpha \frac{dx}{F(x)} \quad (3)$$

where $(\alpha)$ and $(B)$ are the limits in the direction of the X axis of the films 114 and 214—214, $(y)$ is the perpendicular distance of the sides 133, 134, 233 and 234 from the X axis and $(y)$ equals a predetermined function of $(x)$.

If the thin films 114 and 214—214 are illuminated normally across their entire surfaces 126 and 226, the action of the light reduces the dark resistance $R_d$ by an amount governed by the equation:

$$R=\frac{1}{QI^{-\frac{1}{M}}+\frac{1}{R_d}} \quad (4)$$

where $M$ and $Q$ are coefficients the magnitudes of which are dependent upon the material comprising the units 109 and 209—209, and $I$ is the illumination.

It will be recognized that Equation 4 defines a parallel circuit in which one leg $R_d$ defines the dark resistance of the square and the other leg $QI^{-1/M}$ defines the shunting effect generated by the action of the light. Expressing $QI^{-1/M}$ in terms of $R_d$ so that:

$$QI^{-1/M}=K_p R_d \quad (5)$$

where $K_p$ is the relative magnitude of a shunting resistor generated across the dark resistance of the square of film due to the applied illumination, then the resistance $R$ expressed in Equation 4 becomes:

$$R=\frac{K_p}{1+K_p} \times R_d \quad (6)$$

It will be understood that when the configurations of the thin films are other than squares, hence are similar to the general configurations set forth in FIGS. 6 and 10 for the films 114 and 214—214, Equation 6 is written as:

$$R=\frac{K_p}{1+K_p}(A)(R_d) \quad (7)$$

Considering the thin films 114 and 214—214 shown in FIGS. 6 and 10 wherein the films are formed on the substrates 101 and 201 symmetrically with respect to the X axes 106 and 206 and are illuminated by the beam 142 of light having the first intensity and by the strips 144, 145 and 146 of light having a second intensity, and where the strips have a constant length $(dx)$ are positioned perpendicular to the X axes. With these criteria in view, the effective resistance $R_X$ across the units 109 and 209—209, is the sum of the resistances of the background sections 147 and 241, 242, 244 and 245, respectively, and of the contrasting sections 143 and 243 and 246, respectively, so that $R_X$ of each of the units 109 and 209—209 equals:

$$R_X=R_1+R_c+R_3 \quad (8)$$

or in terms of Equation 7:

$$R_X=\left[\frac{K_p}{1+K_p}(A_1)+\frac{K_c}{1+K_c}(A_C)+\frac{K_p}{1+K_p}(A_3)\right]R_d \quad (9)$$

Inserting in Equation 9 the generalized expression for the aspect ratio $A$ according to Equation 3:

$$R_X=\left[\frac{K_p}{1+K_p}\frac{b}{F(x)}+\frac{K_c}{1+K_c}\frac{c}{F(x)}+\frac{K_p}{1+K_p}\frac{a-b-c}{F(x)}\right]R_d \quad (10)$$

where $K_c$ is the relative magnitude of a shunt resistor generated across the contrasting illuminated sections by the contrast strips 144, 145 and 146. Equation 10 may be simplified and expressed as follows:

$$R_X=\left[\frac{K_p}{1+k_p}\frac{a}{F(x)}+\left(\frac{K_c}{1+K_c}-\frac{K_p}{1+K_p}\right)\frac{c}{F(x)}\right]R_d \quad (11)$$

The factors $a/F(x)$ and $c/F(x)$ will be recognized as the respective aspect ratios $A_p$ and $A_C$ of the entire thin film pattern and the contrasting sections 143, 243 and 246, respectively. Accordingly, the resistance $R_X$ of the photo-conductive films of the general geometric patterns shown in FIGS. 6 and 10 and illuminated in the above described manner, can be expressed in the following general form:

$$R_X=\left[\frac{K_p}{1+K_p}A_p+\left(\frac{K_c}{1+K_c}-\frac{K_p}{1+K_p}\right)A_C\right]R_d \quad (12)$$

The equivalent circuit defined by Equation 12 is shown in FIG. 7 as a series circuit of two resistive elements 290 and 291. The first resistive element 290 is expressed in terms of the entire thin film 114 being illuminated by an amount of light defined by the factor $K_p$. The second resistive element 291 is a function of the aspect ratio $A_C$ of the contrasting section 143 and the contrast term:

$$\frac{K_c}{1+K_c}-\frac{K_p}{1+K_p} \quad (13)$$

The contrast term (13) may have either polarity depending upon the brightness of the contrasting section 143 relative to that of the background sections 147.

For purposes of simplification of Equation 12, let:

$$\frac{K_p}{1+K_p}=P \quad (14)$$

and $$\frac{K_c}{1+K_c}=C \quad (15)$$

Then $R_X$ may be expressed as follows:

$$R_X=[PA_p+(C-P)A_C]R_d \quad (16)$$

Accordingly, for a thin film 114 having a given configuration and for constant factors of illumination $K_c$ and $K_p$, the terms $P$, $C$ and $A_p$ are constants, and the term $A_C$ is a variable, depending for its magnitude upon the position of the contrasting section 143 with respect to the Y axis 107.

Referring now to FIG. 8, there is shown an embodiment 300 of the photoconductive device 100 wherein electrodes 316 and 322 ___ formed along side edges 333 and 334 of the thin film 114 of photoconductive material. The foregoing analysis expressed in Equations 1 through 16 is modified by this change in the location of the electrodes 316 and 322 such that the total conductance G of the thin film 114 between the electrodes 316 and 322, equals the sum of the conductances of sections 143 and 147 which are illuminated by the strip 114 and beam 142, respectively, of light having contrasting intensities of illumination.

Accordingly, Equation 12 need only be translated into terms of conductance G. This may be done by expressing the conductance G in terms of Equation 7:

$$R = \frac{K_p}{1+K_p} A R_d \quad (7)$$

so that the conductance G of a film having the electrodes 316 and 322 is expressed as follows:

$$G = \frac{1}{R} = \frac{1}{\frac{K_p}{1+K_p} A R_d} = \frac{1+K_p}{K_p} \frac{1}{A} \frac{1}{R_d} \quad (17)$$

or $$G = \frac{1+K_p}{K_p} \frac{G_d}{A} \quad (18)$$

In the form of Equation 12, the sum of the three conductances of the left section 147, the contrasting section 143, and the right section 147 thus equates to:

$$G = \left[\frac{1+K_p}{K_p} \frac{1}{A_1} + \frac{1+K_c}{K_c} \frac{1}{A_C} + \frac{1+K_p}{K_p} \frac{1}{A_3}\right] G_d \quad (19)$$

Equation 19 may also be expressed in more simple terms as follows:

$$G = \left[\frac{1+K_p}{K_p} \frac{1}{A_P} + \left(\frac{1+K_c}{K_c} - \frac{1+K_p}{K_p}\right) \frac{1}{A_C}\right] G_d \quad (20)$$

Referring now to FIGS. 10 and 16, the article 149 may be considered as being a mesa type transistor. Light from the optical system 150 directed onto the transistor 149 is reflected from mesa slopes 180—180 in a relatively dark rectangular pattern 181 overlapping the generally lighter or contrasting beam 142 of illumination. It may be understood that the generally rectangular pattern 181 forms the left and right contrasting sections 243 and 246 on the surface 226 of the thin film 214—214 whereas the generally lighter beam 142 of illumination forms the respective background sections 241, 242, 244 and 245 of the surface of the thin films 214—214. The left contrast strip 145 of illumination is incident to the surface 226 of the left unit 210 and may be positioned anywhere between the electrodes 216 and 217 according to the position of the mesa type transistor with respect to the reference 155. Similarly, the right contrast strip 146 of illumination is positioned between the electrodes 222 and 223 according to the position of the transistor 149.

The dual film photosensitive detector 200 may be connected in the bridge network 260 as shown in FIG. 11. It will be recalled that the expression for the resistance $R_X$ of the single photoconductive unit 109 was expressed in Equation 16 as follows:

$$R_X = [PA_P + (C-P)A_C] R_d \quad (16)$$

Equation 16 also may be expressed as follows:

$$R_X = PA_p R_d + (C-P) A_C R_d \quad (21)$$

and $$R_X = R_P + R_C \quad (22)$$

Where $R_{LX}$ equals the resistance $R_X$ of the thin film 214—214 of the left unit 210 of the dual photosensitive detector 200 and $R_{RX}$ equals the resistance $R_X$ of the thin film 214—214 of the right unit 211 of the dual photosensitive detector 200, the resistances $R_{LX}$ and $R_{RX}$ of the respective legs 261 and 262 of the bridge network 260 are as follows:

$$R_{LX} = R_{lp} + R_{lc} \quad (23)$$

and $$R_{RX} = R_{rp} + R_{rc} \quad (24)$$

Each of the legs 263 and 264 of the bridge network 260 is provided with resistances $R_X$ according to Equation 16 which resistances $R_X$ are equal to the resistance of each thin film 214—214 at the null position of the transistor with respect to the reference axis 155.

The bridge output ($e$) for the circuit conditions shown in FIG. 11, may be expressed:

$$e = \left[\frac{R_X}{R_X + R_{RX}} - \frac{R_X}{R_X + R_{LX}}\right] E \quad (25)$$

and $$\frac{e}{E} = \left[\frac{[R_{LX} - R_{RX}] R_X}{(R_X + R_{RX})(R_X + R_{LX})}\right] \quad (26)$$

If $R_X$ is set to the resistance value of $R_{RX}$ and $R_{LX}$ at the null position, and the bridge unbalance $$\frac{R_{LX} - R_{RX}}{R_X}$$

is small, then:

$$\frac{e}{E} = \frac{R_{LX} - R_{RX}}{(2R_X)^2} R_X = \frac{R_{LX} - R_{RX}}{4 R_X} \quad (27)$$

Defining $X_R$ as the percent unbalance, $X_R$ may be expressed as follows:

$$X_R = \frac{R_{LX} - R_{RX}}{R_X} (100) \quad (28)$$

In terms of bridge output ($e$) in millivolts to bridge input in volts (E), the ratio $e/E$ may be expressed as follows:

$$\frac{e}{E} = \frac{10^3 X_R}{400} = 2.5 X_R \frac{mV \text{ (out)}}{V \text{ (in)}} \quad (29)$$

Substituting Equations 16, 23 and 24 in Equation 28, the percent bridge unbalance $X_R$ becomes:

$$X_R = \left[\frac{100(C-P)}{PA_p + (C-P)A_{CB}}\right](A_{CL} - A_{CR}) \quad (30)$$

Expressing the first factor as a constant $M_r$, Equation 30 may be written in simpler form as follows:

$$(X_R = M_R (A_{CL} - A_{CR})) \quad (31)$$

Additionally, if each of the thin films 214—214 of the dual photosensitive detector 200 is provided with electrodes 316 and 322 as shown in FIG. 8, then the percent bridge unbalance expressed in Equation 31 becomes $X_g$ as follows:

$$X_g = M_g \left[\frac{1}{A_{CL}} - \frac{1}{A_{CR}}\right] \quad (32)$$

It may be understood that Equations 31 and 32 express the percent bridge unbalance $X_R$ and $X_g$ in terms of coefficients $M_R$ and $M_g$, respectively, which are functions of the basic bridge and thin film pattern parameters. Equations 31 and 32 also contain a variable factor, the magnitude and polarity of which is a function of the relative displacement $ks$ of the contrast bands 243 and 246 from the Y axis 207.

As stated above, the aspect ratio A for a thin film of photoconductive material of the general pattern shape shown in FIG. 10, is expressed in Equation 3 as follows:

$$A = \int_B^\alpha \frac{dx}{F(x)} \quad (3)$$

As the transistor 149 is moved with respect to the reference axis 155, the left and right contrasting sections 243 and 246 will also be displaced so that the magnitude of $F(x)$ in Equation 3 will increase for the left aspect ratio $A_{CL}$, for example, and decrease for the other aspect ratio $A_{CR}$ for example.

It may be understood that the position of the left and right contrast bands 243 and 246 must be limited to the photosensitive surface 226 of each of the thin films 214—214 in order for the general Equations 31 and 32 to be valid. Thus, the position-control range of the photosensitive detector 200 is limited to the distance $$\pm \frac{S - 2r}{2}$$

The active range ($a$) of each of the thin films 214—214 must then equal $$a = \frac{2(S-2r)}{2} + c = S + c - 2r \quad (33)$$

Normalizing the patterns of FIGS. 6 and 10 with respect to the spacing $S$ between the inner end edges of the left and right contrasting sections 243 and 246, then:

$$\left.\begin{array}{l} S = 1 \\ r = kr \\ c = kc \\ b_n = \dfrac{1-2kr}{2} \\ a = \dfrac{2(1-2kr)}{2} + kc = 1 + kc - 2kr \\ r + b_n = kr + \dfrac{(1-2kr)}{2} = 0.5 \end{array}\right\} \quad (34)$$

where ($b_n$) is the nominal value of ($b$) at balance.

Combining Equations 3 and 31 and substituting the normalized equivalents of Equations 34, the result is expressed as follows:

$$X_R = \frac{M_R}{2} \int_{(0.5+ks)}^{(0.5+K_c+ks)} \frac{dx}{F(x)} - \int_{(0.5-ks)}^{(0.5+K_c-ks)} \frac{dx}{F(x)} \quad (35)$$

which is a general statement of bridge unbalance $X_R$ resulting from displacement of the contrasting sections 243 and 246 along the X axis 206 with respect to the Y axis 207. It may be understood from consideration of Equation 35, that the factor $F(x)$ which governs the shape of the pattern of each thin film 214—214 will vary from one pattern shape to another. Accordingly, the factor $F(x)$ is the factor which will govern the shape of the curves 284, 285, 286 and 287 of displacement versus aspect ratio differential ($A_{CL} - A_{CR}$), and thus it is the factor which may be related to the dynamic response of the system 151 for compensating for such characteristic of the system.

Referring now to FIG. 12 with Equation 35 in view, the expression $y = F(x)$ for the pattern of thin films 214—214 shown in FIG. 12 is:

$$W = x\theta \quad (36)$$

Substituting Equation 36 in Equation 35 and performing the indicated integration, $X_R$ is as follows:

$$X_R = \frac{M_R}{2\theta} \log_e \frac{(0.5+kc+ks)(0.5-ks)}{(0.5+kc-ks)(0.5+ks)} \quad (37)$$

Referring now to FIG. 13, the side edges 233 and 234 are expressed as follows:

$$y = F(x) = \frac{1}{D-x} \quad (38)$$

Therefore, substituting Equation 38 into Equation 35 and performing the necessary integration, $X_R$ is as follows:

$$X_R = M_R kcks \quad (39)$$

Referring now to FIG. 14, the side edges 233 and 234 of the thin films 214—214 are governed by the following equation:

$$y = F(x) = \sqrt{2Px} \quad (40)$$

Substituting Equation 40 into Equation 35 and performing the necessary integration, $X_R$ may be expressed as follows:

$$X_R = \frac{M_R}{\sqrt{2P}} [\sqrt{X}]_{0.5+kc-ks}^{0.5+kc+ks} - [\sqrt{X}]_{0.5-ks}^{0.5+ks} \quad (41)$$

Referring now to FIG. 1, there is illustrated a detector 10 including a circular substrate 11, of glass, for example, which may easily be incorporated in the electro-optical positioning system 151 of the type described in the previously mentioned Patent 3,029,348. Upon substrate 11 are thin films 214—214 of photoconductive material having a configuration forming symmetrically positioned photosensitive trapezoids 12 and 13. Attached to the bases of trapezoids 12 and 13 and extending therewith are terminal electrodes 14 and 15, and 16 and 17, respectively. Such electrodes may advantageously comprise thin gold films formed on substrate 11 by conventional masking techniques. Connected to the electrodes are terminal leads 18, 19, 20, and 21, which may connect detector 10 to bridge circuitry 260 for the deriving servo-control signal 154.

The sensitivity characteristic of detector 10, i.e., the change in photoconductive resistance of trapezoid 13, or 12, with a position change of a dark area 25, is in accord with the following explanation:

The dark resistance of trapezoid 13 i.e., when it is not illuminated, is governed by the equation:

$$R_d = \frac{R_N}{2 \tan \theta} \left[ \log \frac{D}{r} \right] \quad (42)$$

where:

$D$ is the distance between electrode 17 and the Y axis;
$r$ is the distance between electrode 16 and the Y axis;
$\theta$ is the angle formed between the X axis and a side 22 of trapezoid 13;
$R_d$ is the dark resistance of trapezoid 13; and
$R_N$ is the unit resistance of a dark square of the particular photoconductive material involved.

Generally, the resistance of any illuminated light sensitive resistor may be expressed as Equation 43 which is similar to Equation 4 above:

$$R_X = \frac{1}{AI^{-\frac{1}{X}} + \frac{1}{R_d}} \quad (43)$$

where:

(A) and ($x$) are coefficients, the magnitudes of which are dependent upon the material comprising the illuminated resistor;
$R_d$ is the dark resistance of the resistor; $I$ is the illumination; and
$R_X$ is the resistance of an illuminated light sensitive resistor.

Figure 2:
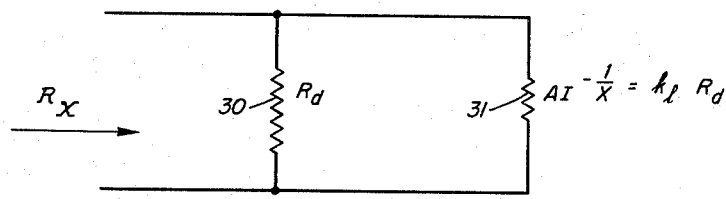
FIG. 2 illustrates an equivalent circuit representing Equation 43 defined hereinbelow.

Equation 43 may be represented by an equivalent circuit having resistors 30 and 31 connected in parallel, as depicted in FIG. 2. If the illumination ($I$) is such that the resistance of resistor 30 equals $klR_d$ where $kl$ equals $Kp$, and:

$$AI^{-1/X} = klR_d$$

then:

$$R_X = \frac{1}{\frac{1}{KlR_d} + \frac{1}{R_d}} = \frac{kl}{1+kl} Rd \quad (44)$$

If the detector 10 is illuminated by an image having a dark border 23, each of trapezoids 12 and 13 will have a dark area 25 and two bright areas 24 and 26. Assuming that the illumination factor of each of the bright areas 24 and 26 is $kl$, and that of dark area 24 is $k_d$, in accordance with Equations 42 and 44, $$R_{X_{24}} = \frac{R_N}{2 \tan \theta} \left[ \frac{kl}{1+kl} \log \frac{r+B}{r} \right] \quad (45)$$

$$R_{X_{25}} = \frac{R_N}{2 \tan \theta} \left[ \frac{k_d}{1+k_d} \log \frac{r+B+ka}{r+B} \right] \quad (46)$$

$$R_{X_{26}} = \frac{R_N}{2 \tan \theta} \left[ \frac{kl}{1+kl} \log \frac{D}{r+B+ka} \right] \quad (47)$$

where:

$B$ is the distance between electrode 20 and the inner side of area 25;

$k$ represents the relative width of area 25 with respect to the width $a$ of trapezoid 13; and $R_{X_{24}}$, $R_{X_{25}}$ and $R_{X_{26}}$ are the respective resistances of the illuminated areas 24, 25 and 26, the remaining terms being previously defined.

Since areas 24, 25 and 26 are adjacent to each other and thus are arranged in series, in accordance with Equation 8:

$$R_{X_{13}} = R_{X_{24}} + R_{X_{25}} + R_{X_{26}} \qquad (48)$$

From Equations 45, 46, 47 and 48, it follows that $$R_{X_{13}} = \frac{R_N}{2 \tan \theta} \left[ \frac{kl}{1+kl} \log_e \frac{D}{r} + \left( \frac{k_d}{1+k_d} - \frac{kl}{1+kl} \right) \log_e \frac{r+B+ka}{r+B} \right] \qquad (49)$$

Figure 3:
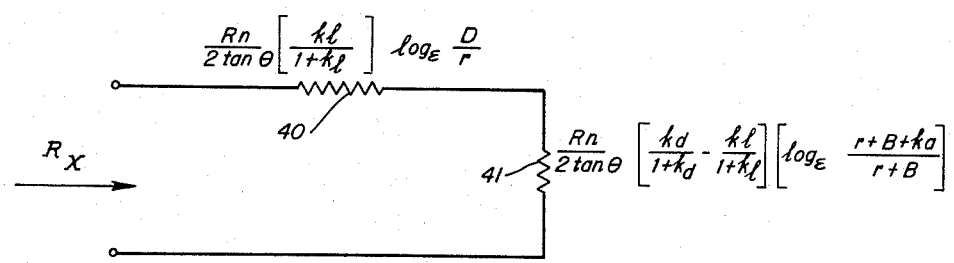
FIG. 3 illustrates an equivalent circuit representing Equation 49 defined hereinbelow.

Equation 49 may be represented by an equivalent circuit having a pair of series connected resistors 40 and 41, as depicted in FIG. 3. Resistor 40, i.e., the resistance defined by the first term of Equation 49, represents that resistance which would prevail if the entire area of trapezoid 13 were uniformly illuminated. Resistor 41, which represents the second term of Equation 49, has a value which is a function of the area of dark border area 25 lying within trapezoid 13, the respective position of area 25 within trapezoid 13, i.e., the magnitude of B; and the degree of difference in illumination between areas 24 and 25, and 25 and 26. (Resistor 41 may have different polarities depending upon whether area 25 is lighter or darker than areas 24 and 26.) Considering FIG. 1 in view of Equation 49, if area 25 is moved laterally across trapezoid 13 (i.e., B is varied), only the second term of Equation 49 is affected, and then only its log factor. Thus, $$\Delta R_{X_{13}} = f \log_e \left[ \frac{r+B+ka}{r+B} \right] \qquad (50)$$

Since the factor $k$ of $ka$ represents the relative width of area 25 with respect to the width of trapezoid 13, $$r+B+ka = r+B+k(D-r) \qquad (52)$$

and $$\Delta R_{X_{13}} = f \log_e \left[ 1 + \frac{k(D-r)}{r+B} \right] \qquad (52)$$

Figure 4:
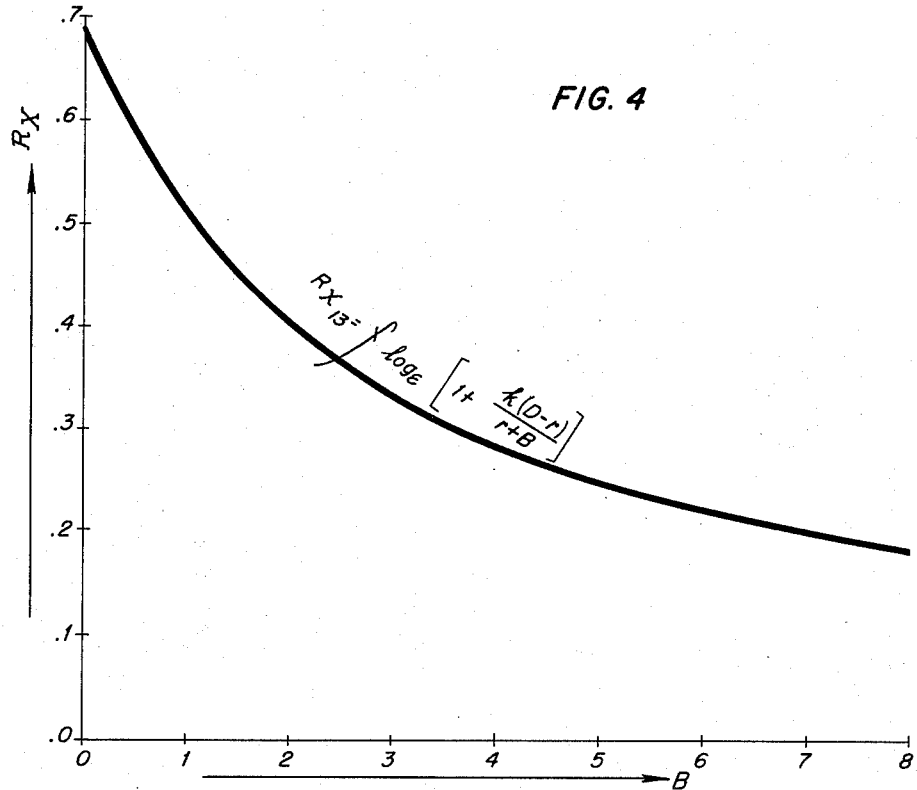
FIG. 4 illustrates the manner in which the resistance of a thin film of photoconductive material in the form of the trapezoids of the embodiment of FIG. 1 varies as a differentially illuminated strip moves thereacross.

FIG. 4 depicts the locus of Equation 52 where the Y coordinate is in proportion to $R_{X_{13}}$ and the X coordinate represents units of B, when representative unit values of D, $a$, $r$ and K are, respectively, 12, 10, 2 and ⅕. The increasing slope of this locus in the direction of decreasing B, i.e., in the direction toward electrode 16, represents an increase in sensitivity in this direction.

Since, in a like manner, the sensitivity of trapezoid 12 may be shown to increase in the direction of electrode 15, trapezoids 12 and 13 have increasing sensitivities in opposing directions. It is these increasing opposing sensitivities that substantially eliminate the servo-hunting of a previously mentioned system when a detector of the present invention is incorporated therein.

Referring to FIG. 15, the aspect ratio difference ($A_{CL} - A_{CR}$) of the detector 10 shown in FIG. 1, is indicated by the curve 285, showing that the aspect ratio differential ($A_{CL} - A_{CR}$) for the trapezoids 12 and 13 is between that of the thin films 214—214 shown in FIGS. 14 and 5 and indicated by curves 286 and 284.

FIG. 5 illustrates a second embodiment of the present invention which differs principally from that depicted by FIG. 1 in that a pair of sides of each of the symmetrical photoconductive wings form arcs of semicircles having diameters equal in length to the distance between these terminal electrodes farthest removed from each other. More specifically, symmetrically positioned thin films 12 and 13 of FIG. 5 have curved sides defining arcs of semicircles having radii equal to D and whose centers are on the Y axis D distance above and below the X axis. An analysis of the sensitivity characteristics of films 12 and 13 of this embodiment, in a manner analogous to that described above in regard to the trapezoids depicted in FIG. 1, will indicate that the respective sensitivities of films 12 and 13 of FIG. 5 increase in opposite directions as do those of the priorly considered trapezoids 12 and 13, but at a faster rate in the vicinity of electrodes 15 and 16, (i.e., where B is small).

Referring again to FIG. 15, the graph 280 illustrates $ks$ representing displacement of the article 149 from the reference axis 155 on the abscissa 281, and corresponding aspect ratio differences ($A_{CL} - A_{CR}$) of Equation 31 on the ordinate axis 282. It may be appreciated from FIG. 15, that the thin film patterns shown in FIGS. 1, 5, 13 and 14 produce significantly different aspect ratio differences ($A_{CL} - A_{CR}$) for the same displacement of the article 149 from its reference axis 155. This permits the dynamic response characteristic of the system 151 to be taken into consideration when the pattern of the thin films 214—214 is chosen. Accordingly, by reference to Equation 31, and with the known dynamic response characteristic of the system 151 in view, the configuration of the thin films 214—214 may be "tailored" to produce a predetermined resistance $R_X$ and hence, a predetermined percent bridge unbalance $X_R$ which will regulate the servo control signal 154 such that the system 151 will position the article 149 directly in alignment with the reference axis 155 without servo hunting.

It is to be understood that the above-described embodiments are simply illustrative of the principles of the invention. Numerous other arrangements and modifications may be devised by one skilled in the art without departing from the spirit and scope of the invention.

I claim:

1. In an apparatus for positioning an article wherein a servo positioning system having a known dynamic response characteristic tending to cause a condition of servo hunting of the servo positioning system is controlled in response to the position of a pair of strips of illumination indicative of the position of the article, the combination comprising:

two photoconductve films upon which films the pair of strips of illumination are directed, the position of the pair of strips of light on the films being directly related to the position of the article, the films being symmetrically formed about coordinate axes $(x,y)$ with opposed side edges converging toward said $x$-axis and having opposed end edges, the distance $(y)$ from the $x$-axis of any point on a side edge being a function of the distance along the $x$-axis from the origin of the coordinate axes $(x,y)$; and means connecting the respective end edges of each photoconductive film for generating an output signal to operate said servo positioning system, said output signal being proportional to the position of the strips of illumination on the films, the films being positioned relative to the article so that the output signal from each film will be the same when the article is in a predetermined position, and the relationship between the distance $(y)$ of a point on a side edge with respect to its distance $(x)$ from the origin of the coordinate axes $(x,y)$ being chosen so that the output signal from the films compensates for the known dynamic response characteristics of the servo positioning system to eliminate servo hunting of the system.

2. A system for positioning an article with respect to a first axis, wherein the position of the article is represented by the position of a pair of strips of illumination, said system comprising:

servo means for moving said article from a first position with respect to said first axis into a second position with respect to said first axis, said servo means operating in response to a control signal and having a dynamic response characteristic tending to cause a condition of servo hunting of said servo means;

variable resistance means responsive to the position of said pair of strips indicative of positioning of said article in said second position, said variable resistance means including first and second thin films of photoconductive material formed symmetrically with respect to a second axis corresponding to said first axis, said first and second films each having opposed end edges, each of said films having opposed side edges converging toward said second axis according to a predetermined equation $y=F(x)$ where $(y)$ is the distance between said side edges and $(x)$ is the distance thereof from a point on said second axis, said expression $F(x)$ being preselected according to the dynamic response characteristic of said servo means for shaping each thin film to provide a section of each thin film illuminated by one of said strips so that the aspect ratio of said section bears a predetermined relationship to the position of said article with respect to said first axis; and means connecting the respective end edges of said first and second thin films for generating said output signal to operate said servo means and preclude occurrence of said condition of hunting, said output signal being proportional to the difference between said aspect ratios for compensating for said dynamic response characteristic to preclude said condition of hunting so that said servo means moves said article directly to said second position in response to said control signal.

3. A system for positioning an article with respect to a first axis, wherein the position of the article is represented by the position of a pair of strips of illumination, said system comprising:

servo means for moving said article from a first position with respect to said first axis into a second position with respect to said first axis, said servo means operating in response to a control signal and having a dynamic response characteristic tending to cause a condition of servo hunting of said servo means;

variable resistance means responsive to the position of said pair of strips indicative of a positioning of said article in said second position, said variable resistance means including first and second films of photoconductive material formed symmetrically with respect to a second axis corresponding to said first axis, said first and second films having side edges formed by two straight lines intersecting each other on the second axis, each straight line forming an included angle $\theta$ (in radians) with the second axis, each of the thin films having opposed end edges, the end edge of each film most remote from the point of intersection of the two straight lines being formed by an arc W on either side of the second axis where the arcuate length of W equals $\theta x$, $x$ being a predetermined distance from the point of intersection of the two straight lines, the end edge of each film closest to the point of intersection of the two straight lines being formed by an arc on either side of the second axis where the arcuate length equals $\theta K_r$, $K_r$ being a predetermined distance from the point of intersection of the two straight lines, the dimensions of the film being preselected according to the dynamic response characteristic of said servo means to provide a section of each film illuminated by one of said strips so that the aspect ratio of said section bears a predetermined relationship to the position of said article with respect to said first axis; and means connecting the respective end edges of said first and second thin films for generating said output signal to operate said servo means and preclude occurrence of said condition of hunting, said output signal being proportional to the difference between said aspect ratios for compensating for said dynamic response characteristic to preclude said condition of hunting so that said servo means moves said article directly to said second position in response to said control signal.

4. A method of positioning an article relative to a first reference axis wherein the position of the article is represented by a pair of strips of light reflected onto a variable resistance device having a pair of photoconductive films positioned symmetrically with respect to a second reference axis, each of said films being divided by one of said strips into a section having an aspect ratio which varies as a predetermined function of distance thereof from said second axis, said article mounted for movement in response to energization of a servo system having a predetermined dynamic response characteristic, said method comprising:

tailoring each of said thin films so that said aspect ratios of said sections compensate for said dynamic response characteristic of said servo means;

establishing across each of said tailored thin films a resistance path having a resistance varying with variations of said aspect ratio of each section;

conducting a signal across each of the resistance paths for regulation in proportion to the resistance thereof;

determining the difference between said regulated signals;

generating an output signal in response to the difference between the regulated signals; and energizing said servo means with said output signal to move said article directly into alignment with said first reference axis.

References Cited by the Examiner

UNITED STATES PATENTS

| | | | |
|---|---|---|---|
| 2,489,221 | 11/49 | Herbold | 250—211 X |
| 2,509,705 | 5/50 | Stolze et al. | 250—211 X |
| 2,838,876 | 6/58 | Smith | 250—203 X |
| 2,879,405 | 3/59 | Pankove | 250—211 |
| 2,896,086 | 7/59 | Wunderman | 250—211 |
| 3,033,073 | 5/62 | Shuttleworth | 250—211 |
| 3,076,949 | 2/63 | Anderson | 250—211 X |
| 3,084,261 | 4/63 | Wilson | 250—203 |
| 3,087,069 | 4/63 | Moncrieff-Yeates | 250—211 |
| 3,105,625 | 10/63 | Miserocchi et al. | 250—211 X |

RALPH G. NILSON, *Primary Examiner.*

UNITED STATES PATENT OFFICE
CERTIFICATE OF CORRECTION

Patent No. 3,193,686                                            July 6, 1965

Alfred Heinz

It is hereby certified that error appears in the above numbered patent requiring correction and that the said Letters Patent should read as corrected below.

Column 8, line 53, for "Curve 285" read -- Curve 286 --; column 9, line 42, for "magnitudes" read -- magnitude --; column 1 equations (19) and (20), for that portion of each equation reading "$G_d$", each occurrence, read -- $G_n$ --; column 14, equation (42), fo that portion reading "log" read -- $\log_e$ --; line 50, for "$k1R_d$ where k1" read -- $k_1R_d$ where $k_1$ --; line 52, for that portion of the equation reading "$=k1R_d$" read -- $=k_1R_d$ --; same column 14, equation (44) should appear as shown below instead of as in the patent:

$$R_X = \frac{1}{\frac{1}{K_1R_d} + \frac{1}{R_d}} = \frac{k_1}{1+k_1} R_d$$

same column 14, line 62, for "k1" read -- $k_1$ --; same column 14, equation (45) should appear as shown below instead of as in the patent:

$$R_{X_{24}} = \frac{R_N}{2 \tan \theta} \left[ \frac{k_1}{1+k_1} \log_e \frac{r+B}{r} \right]$$

same column 14, equation (46), for that portion reading "log" read -- $\log_e$ --; same column 14, equation (47) should appear as shown below instead of as in the patent:

$$R_{X_{26}} = \frac{R_N}{2 \tan \theta} \left[ \frac{k_1}{1+k_1} \log_e \frac{D}{r+B+ka} \right]$$

column 15, equation (49) should appear as shown below instead of as in the patent:

$$R_{X_{13}} = \frac{R_N}{2 \tan \theta} \left[ \frac{k_1}{1+k_1} \log_e \frac{D}{r} + \left( \frac{k_d}{1+k_d} - \frac{k_1}{1+k_1} \right) \log_e \frac{r+B+ka}{r+B} \right]$$

same column 15, equations (50) and (52), for that portion of each equation reading "f", each occurrence, read -- $\int$ --; same column 15, line 42, the equation numbered "(52)" should be renumbered as equation -- (51) --; line 72, for "farthest" read -- furthest --.

Signed and sealed this 14th day of December 1965.

(SEAL)
Attest:

ERNEST W. SWIDER
Attesting Officer

EDWARD J. BRENNER
Commissioner of Patents